(12) United States Patent
George et al.

(10) Patent No.: US 10,002,203 B2
(45) Date of Patent: Jun. 19, 2018

(54) SERVICE DESK DATA TRANSFER INTERFACE

(71) Applicant: BMC SOFTWARE, INC., Houston, TX (US)

(72) Inventors: Mark A. George, Suwanee, GA (US); Cynthia L. Sturgeon, Southlake, TX (US)

(73) Assignee: BMC Software, Inc., Houston, TX (US)

( * ) Notice: Subject to any disclaimer, the term of this patent is extended or adjusted under 35 U.S.C. 154(b) by 442 days.

(21) Appl. No.: 14/729,684

(22) Filed: Jun. 3, 2015

(65) Prior Publication Data

US 2015/0269276 A1    Sep. 24, 2015

Related U.S. Application Data

(63) Continuation of application No. 14/467,768, filed on Aug. 25, 2014, which is a continuation of application
(Continued)

(51) Int. Cl.
*G06F 17/30* (2006.01)
*H04L 29/08* (2006.01)
*G06F 3/0484* (2013.01)

(52) U.S. Cl.
CPC .... *G06F 17/30917* (2013.01); *G06F 3/04842* (2013.01); *G06F 17/303* (2013.01);
(Continued)

(58) Field of Classification Search
CPC ......... G06F 17/30917; G06F 17/30292; G06F 17/303; G06F 17/3056; G06F 17/30575;
(Continued)

(56) References Cited

U.S. PATENT DOCUMENTS 4,999,766 A    3/1991 Peters et al.
5,021,995 A    6/1991 Quint et al.
(Continued)

FOREIGN PATENT DOCUMENTS

WO    2000/042513 A1    7/2000

OTHER PUBLICATIONS

Non-Final Office Action for U.S. Appl. No. 14/467,743, dated Aug. 7, 2015, 31 pages.
(Continued)

*Primary Examiner* — James Trujillo
*Assistant Examiner* — Aida Z Tessema
(74) *Attorney, Agent, or Firm* — Brake Hughes Bellermann LLP

(57) ABSTRACT

A system and method for managing data transfer operations includes at least one data server including data stored in a plurality of data fields, at least one transaction server operatively coupled to the at least one data server and configured to provide at least one customizable business rule and a customer relationship application, an information server operatively coupled to the at least one transaction server, and at least one workstation operatively coupled to the information server. The least one workstation includes local memory accessible to the customer relationship application and configured to provide web communication and presentation services to a user of the at least one workstation that are deployed on the information server. The at least one customizable business rule specifies a mapping between the plurality of data fields and the local memory, the mapping having been provided by the user interacting with the web communication and presentation services.

20 Claims, 17 Drawing Sheets

Related U.S. Application Data

No. 11/378,585, filed on Mar. 15, 2006, now Pat. No. 8,819,084, which is a continuation of application No. 09/945,413, filed on Aug. 31, 2001, now Pat. No. 7,089,245, application No. 14/729,684, which is a continuation of application No. 14/467,743, filed on Aug. 25, 2014, now Pat. No. 9,710,569, which is a continuation of application No. 11/378,585, filed on Mar. 15, 2006, now Pat. No. 8,819,084, which is a continuation of application No. 09/945,413, filed on Aug. 31, 2001, now Pat. No. 7,089,245.

(52) U.S. Cl.
CPC .... *G06F 17/3056* (2013.01); *G06F 17/30292* (2013.01); *G06F 17/30575* (2013.01); *G06F 17/30864* (2013.01); *H04L 67/02* (2013.01); *H04L 67/10* (2013.01); *Y10S 707/99944* (2013.01); *Y10S 707/99945* (2013.01)

(58) Field of Classification Search
CPC ........... G06F 17/30864; G06F 3/04842; Y10S 707/99944; Y10S 707/99945; H04L 67/02; H04L 67/10
USPC .......................................................... 707/10
See application file for complete search history.

(56) References Cited

U.S. PATENT DOCUMENTS

| | | | |
|---|---|---|---|
| 5,701,423 | A | 12/1997 | Crozier |
| 5,802,514 | A | 9/1998 | Huber |
| 5,848,426 | A | 12/1998 | Wang et al. |
| 5,857,194 | A | 1/1999 | Kelliher et al. |
| 5,893,131 | A | 4/1999 | Kornfeld |
| 5,950,196 | A | 9/1999 | Pyreddy et al. |
| 5,980,129 | A | 11/1999 | Yale |
| 5,983,240 | A | 11/1999 | Shoroff et al. |
| 5,999,937 | A | 12/1999 | Ellard |
| 6,105,030 | A | 8/2000 | Syed et al. |
| 6,151,584 | A | 11/2000 | Papierniak et al. |
| 6,151,608 | A | 11/2000 | Abrams |
| 6,173,284 | B1 | 1/2001 | Brown |
| 6,195,662 | B1 | 2/2001 | Ellis et al. |
| 6,356,901 | B1 | 3/2002 | MacLeod et al. |
| 6,381,600 | B1 | 4/2002 | Lau |
| 6,668,253 | B1 | 12/2003 | Thompson et al. |
| 6,782,400 | B2 | 8/2004 | Geuss et al. |
| 6,795,868 | B1 | 9/2004 | Dingman et al. |
| 6,801,992 | B2 | 10/2004 | Gajjar et al. |
| 6,820,095 | B1 | 11/2004 | Yeung et al. |
| 6,820,135 | B1 | 11/2004 | Dingman et al. |
| 6,865,566 | B2 | 3/2005 | Serrano-Morales et al. |
| 6,963,871 | B1 | 11/2005 | Hermansen et al. |
| 6,965,889 | B2 | 11/2005 | Serrano-Morales et al. |
| 7,089,245 | B1 | 8/2006 | George et al. |
| 8,606,744 | B1 | 12/2013 | Dageville et al. |
| 8,819,084 | B2 | 8/2014 | George et al. |
| 2002/0059299 | A1 | 5/2002 | Spaey et al. |
| 2002/0085029 | A1 | 7/2002 | Ghani |
| 2002/0194196 | A1 | 12/2002 | Weinberg et al. |
| 2005/0131970 | A1 | 6/2005 | Salazar et al. |
| 2006/0179070 | A1 | 8/2006 | George et al. |
| 2014/0365439 | A1 | 12/2014 | George et al. |
| 2015/0040032 | A1 | 2/2015 | George et al. |

OTHER PUBLICATIONS

Response to Non-Final Office Action for U.S. Appl. No. 14/467,743, filed Oct. 1, 2015, 13 pages.
Non-Final Office Action for U.S. Appl. No. 14/467,768, dated Aug. 7, 2015, 31 pages.
Response to Non-Final Office Action for U.S. Appl. No. 14/467,768, filed Oct. 1, 2015, 35 pages.
Final Office Action received for U.S. Appl. No. 11/378,580, dated Jan. 22, 2010, 21 pages.
Response to Non-Final Office Action for U.S. Appl. No. 11/378,580, filed Oct. 10, 2013, 11 pages.
Notice of Allowance received for U.S. Appl. No. 11/378,580, dated Dec. 11, 2013, 18 pages.
Notice of Allowance received for U.S. Appl. No. 11/378,580, dated Feb. 28, 2014, 8 pages.
Notice of Allowance received for U.S. Appl. No. 11/378,580, dated May 21, 2014, 2 pages.
Non-Final Office Action received for U.S. Appl. No. 11/378,585, dated Jan. 20, 2010, 16 pages.
Response to Non-Final Office Action for U.S. Appl. No. 11/378,585, filed Oct. 10, 2013, 11 pages.
Notice of Allowance received for U.S. Appl. No. 11/378,585, dated Jan. 10, 2014, 14 pages.
Notice of Allowance received for U.S. Appl. No. 11/378,585, dated Mar. 18, 2014, 7 pages.
Fraternali, Piero, "Tools and Approaches for Developing Data-Intensive Web Applications: A Survey", ACM Computing Surveys, vol. 31, No. 3, Sep. 1999, pp. 227-263.
Sena et al., "Intelligence Systems: A Sociotechnical Systems Perspective", SIGCPR 1999, pp. 86-93.
Gallant et al., "Successful Customer Relationship Management in Financial Applications (Tutorial PM-1)", 2000, pp. 165-241.
Mee et al., "The DAO of Databases: Using Data Access Objects and the Jet Engine in C++", Microsoft Systems Journal, Jan. 1996, available online at <https://www.microsoft.com/msj/archive/S212.aspx>, retrieved on May 24, 2015, 9 pages.
microsoft.com, "OL97: How to Programmatically Import Outlook Items from Access", Nov. 1998, available online at <https://technet.microsoft.com/enus/ library/cc749863.aspx>, retrieved on May 24, 2015, 2 pages.
"Acessing Outlook98 folders from VB", Visual Basic Programming Question, posted on Nov. 12, 1998, available online at <http://www.experts-exchange.com/Programming/Languages/Visual_Basic/Q_10097633.html>, retrieved on May 24, 2015, 5 pages.
"Chapter 37—MS Outlook Architecture", TechNet Library, Nov. 1997, available online at <https://technet.microsoft.com/en-us/en%C2%ADus/library/cc749863.aspx>, retrieved on May 24, 2015, 13 pages.
Non-Final Office Action received for U.S. Appl. No. 14/467,768, dated Feb. 22, 2016, 20 pages.
Non-Final Office Action received for U.S. Appl. No. 14/467,743, dated Apr. 8, 2016, 11 pages.
Final Office Action for U.S. Appl. No. 14/467,743, dated Oct. 3, 2016, 17 pages.
Final Office Action for U.S. Appl. No. 14/467,768, dated Aug. 30, 2016, 22 pages.
Final Office Action for U.S. Appl. No. 14/467,768, dated Nov. 9, 2016, 18 pages.
Notice of Allowance for U.S. Appl. No. 14/467,743, dated Mar. 27, 2017, 16 pages.
Notice of Allowance for U.S. Appl. No. 14/467,768, dated Mar. 8, 2017, 16 pages.

SERVICE DESK DATA TRANSFER INTERFACE

CROSS-REFERENCE TO RELATED APPLICATIONS

This application is a continuation of and claims priority under 35 U.S.C. § 120 to U.S. application Ser. No. 14/467,768, filed on Aug. 25, 2014, which is a continuation of and claims priority to U.S. application Ser. No. 11/378,585, filed on Mar. 15, 2006, now U.S. Pat. No. 8,819,084, which is a continuation of and claims priority to U.S. application Ser. No. 09/945,413, filed on Aug. 31, 2001, now U.S. Pat. No. 7,089,245. This application also is a continuation of and claims priority under 35 U.S.C. § 120 to U.S. application Ser. No. 14/467,743, filed on Aug. 25, 2014, which is a continuation of and claims priority to U.S. application Ser. No. 11/378,585, filed on Mar. 15, 2006, now U.S. Pat. No. 8,819,084, which is a continuation of and claims priority to U.S. application Ser. No. 09/945,413, filed on Aug. 31, 2001, now U.S. Pat. No. 7,089,245. The contents of the above listed applications are hereby incorporated by reference.

FIELD OF THE INVENTION

The present invention relates to data import and export management, and more particularly to automated user-customizable generation of service applications that manage data import and export operations.

BACKGROUND OF THE INVENTION

Distributed computer systems in general are well known. A typical system comprises a computer and database at a local location, and a computer and database at a remote location. Further, each computer might comprise a CPU, and RAM and allow various software programs to be used. Software programs which might be used include, among others, databases, word processors, and spreadsheets. These software programs can be referred to as user applications.

Databases are also well known and will not be described in detail. Briefly, a database is a group of related information. Typically the related information is organized into records or rows. For simplicity, the term row is used hereinafter. Each row may include one or many fields, each field containing information content in a particular data format. The term information content, as used herein, refers to raw information which is not in any format, whereas the term data refer to information in a particular format, such as, ASCII text. Information content is entered into the fields of a database using a form. A form defines parameters for each field in a particular row in the database, for instance, whether the field accepts numbers, letters or both. A database may contain rows originating from a number of different forms. A database has a natural representation for its data which may be different for different databases. In a relational database, for instance, the natural representation for the data is a table with each row of the table representing a different row of the database and each column a different field of the row. In other databases, the contents may be examined in a number of different "views." A view sorts the rows within a database based on the information content of a particular field within the form with which the row was created. Further, a view may present fields from more than one form and need not present all fields within a form.

It is often desired to access information content within multiple user applications. The term access, as used herein, refers to operations such as moving and copying information content between user applications. For instance, it may be desired to move or copy the information content of a first field of a row of a database, to a second field of a row within a receiving database. Typically, moving and copying operations (move/copy operations) require either opening the database which is to receive the information content and manually entering the desired information into the desired field, or opening both databases and performing a move/copy operation in a known manner.

Both of these approaches have drawbacks. Manual entry, among other things, is time consuming, and susceptible to human error. Performing a move/copy requires the user to enter into and navigate within the application from which the information is to be obtained. For large databases this can be quite time consuming. Moreover, in some cases, move/copy operations between nonadjacent fields or rows can require multiple move/copy operations. Further, databases may not be compatible.

Thus what is needed is a flexible tool that can integrate complex systems. What is also needed is a way to create and install a service application for managing data transfer operations such that the application can be run as a system service that can be scheduled or run periodically, not just as a normal program.

DISCLOSURE OF THE INVENTION

A system, method and computer program product for importing data in a network-based customer relationship application is provided. First, data to be imported to a customer relationship application utilizing a network is identified. A set of predetermined rules associated with the customer relationship application are identified. The data is imported to the customer relationship application utilizing the network in accordance with the set of predetermined rules. The data is stored in memory accessible to the customer relationship application. The fields in which the data is stored in the memory are customizable by a user. Note that the customer relationship application may include any type of application used to perform any customer-related task. One illustrative type of customer relationship application is a service desk application.

In one embodiment, an application for importing the data is generated based on the rules. As an option, the application can be scheduled and/or run periodically at user-defined intervals. In another embodiment, the predetermined rules are specified based on user interaction with an application creation program. In a further embodiment, the rules relate to referential integrity, required fields, and/or automatic sequence numbering. In yet another embodiment, the data is transformed. Preferably, the data is transformed based on user-created scripting functions.

A system, method and computer program product for exporting data in a network-based customer relationship application is also provided. Data to be exported from a customer relationship application utilizing a network is identified. The data is stored in memory accessible to the customer relationship application, in fields which are customizable by a user. A set of predetermined rules associated with the customer relationship application is identified. The data is exported from the customer relationship application utilizing the network in accordance with the set of predetermined rules.

In one embodiment, a service application for exporting the data is generated based on the rules. The service application can be run periodically at user-defined intervals.

According to another embodiment, the predetermined rules are specified based on user interaction with a service application creation program.

In a further embodiment, the data can be transformed. The transformation can be based on user-created scripting functions. Exemplary rules relate to referential integrity, required fields, and/or automatic sequence numbering.

A system, method and computer program product are also provided for generating an application for managing network data transfer operations. A screen for receiving a designation of a type of application to be created is displayed. A screen for receiving a designation of an origin of the data is also displayed. A screen for receiving a designation of a destination for the data is further displayed. A mapping of fields between the origin of the data and the destination of the data is generated. The application is created. A screen is also displayed that allows a user to manipulate the mapping. A data transfer operation is performed upon execution of the application.

In one embodiment, an interval of time that elapses between automatic execution of the application can be specified. According to another embodiment, the type of application can be an SQL/ODBC import application, an SQL/ODBC export application, a file import application, a file export application, an electronic mail import application, and/or an electronic mail export application.

In another embodiment, a name for the application can be specified. Login information can be received for logging in to the origin and/or destination of the data. Information about the data transfer can also be gathered for logging thereof.

In a further embodiment, user manipulation of the mapping includes altering the mapping of fields of the destination of the data to the fields from the origin of the data. In one embodiment, the altering includes providing the names of the fields from the origin of the data which correspond to selected fields of the destination of the data. In another embodiment, the altering includes providing the names of the fields from the destination of the data which correspond to selected fields of the origin of the data. The altering can also include specifying the fields of the data to be transferred.

In a further embodiment, the mapping of the fields includes custom fields added at a client site. In yet another embodiment, scripting functions are received for allowing such things as data transformation.

DESCRIPTION OF THE PREFERRED EMBODIMENTS

Figure 1:
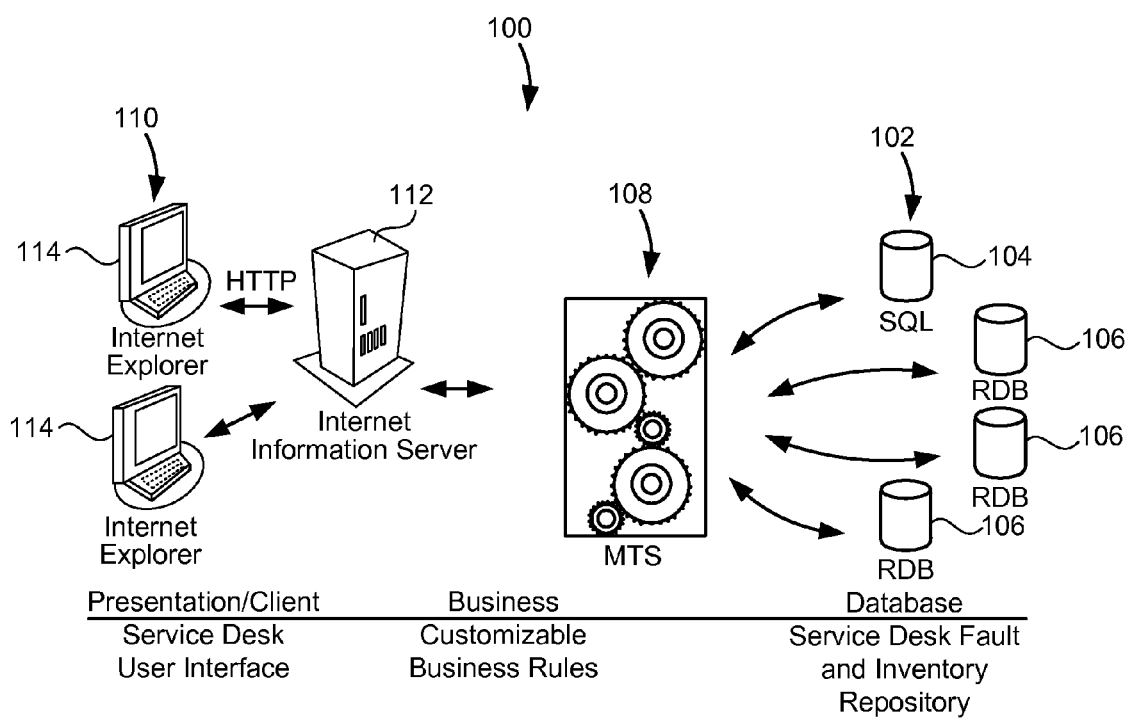
FIG. 1 is a representation of a customer relationship application architecture according to one embodiment.

FIG. 1 depicts an illustrative customer relationship application architecture 100 according to one embodiment. As shown, the architecture 100 includes a database tier 102, which includes one or more data servers, such as one or more Structured Query Language (SQL) servers 104 and one or more Relational Database Management Systems (RDBMS) 106. The database tier 102 is in communication with a business logic tier 108 that delivers customizable business rules and application executables, preferably as a set of Component Object Model (COM) objects that are managed by Microsoft Transaction Server (MTS). A presentation/client tier 110 is also in communication with the business logic tier 108. The presentation/client tier 110 provides web communication and presentation services, which can consist of Active Server Pages that deploy on Microsoft's Internet Information Server 112 for example. Several workstations 114 are coupled to the Information Server 112. Note that this architecture is provided by way of example only and represents only one possible configuration of the architecture 100. One skilled in the art will appreciate that the various components described above may be removed, interchanged and/or added to without straying from the scope and spirit of the various possible embodiments enabled herein. Further, it should be noted that the customer relationship application may include any type of application used to perform any customer-related task. For example, the customer relationship application can be a service desk application, a customer contact application, etc.

Figure 2:
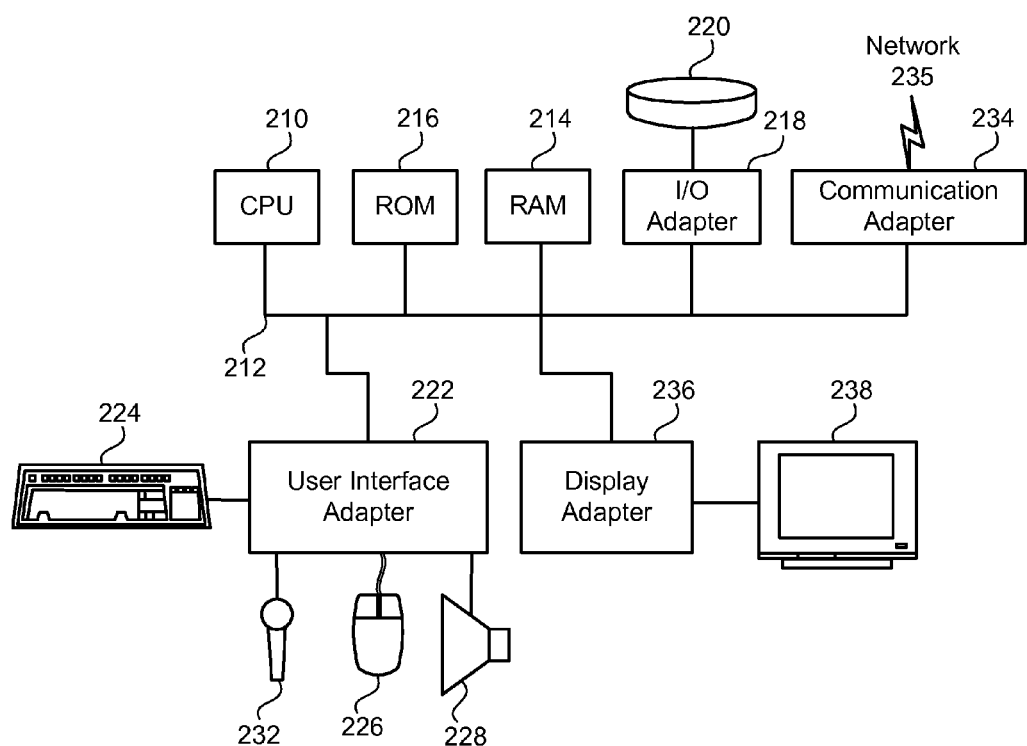
FIG. 2 shows a representative hardware environment that may be associated with the workstations of FIG. 1, in accordance with one embodiment.

FIG. 2 shows a representative hardware environment associated with the workstations 114 of FIG. 1, in accordance with one embodiment. Such figure illustrates a typical hardware configuration of the workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® NT or Windows 2000 Operating System (OS), the IBM OS/2 operating system, the MAC OS, or UNIX operating system. It will be appreciated that a preferred embodiment may also be implemented on platforms and operating systems other than those mentioned. A preferred embodiment may be written using JAVA, C, and/or C++ language, or other programming languages, along with an object oriented programming methodology. Object oriented programming (OOP) has become increasingly used to develop complex applications.

Figure 3:
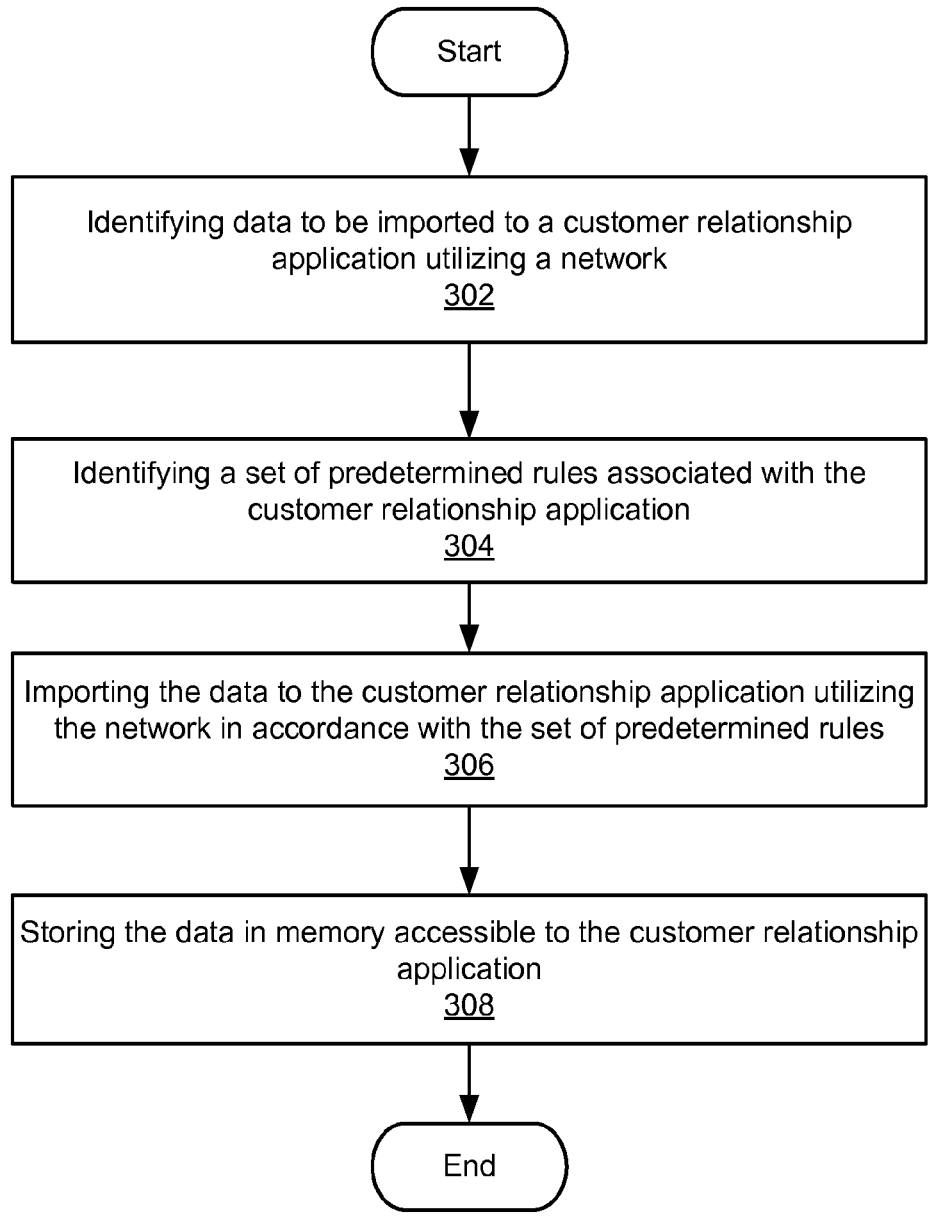
FIG. 3 is a flow diagram of a process for importing data in a network-based customer relationship application according to one embodiment.

FIG. 3 is a flow diagram of a process 300 for importing data in a network-based customer relationship application. In operation 302, data to be imported to a customer relationship application utilizing a network is identified. A set of predetermined rules associated with the customer relationship application are identified in operation 304. In operation 306, the data is imported to the customer relationship application utilizing the network in accordance with the set of predetermined rules. The data is stored in memory accessible to the customer relationship application in operation 308. Note that "memory" as used in this document can include persistent and/or non-persistent storage, such as RAM, a hard drive, tape media, etc. The fields in which the data is stored in the memory can be customized by a user.

Figure 4:
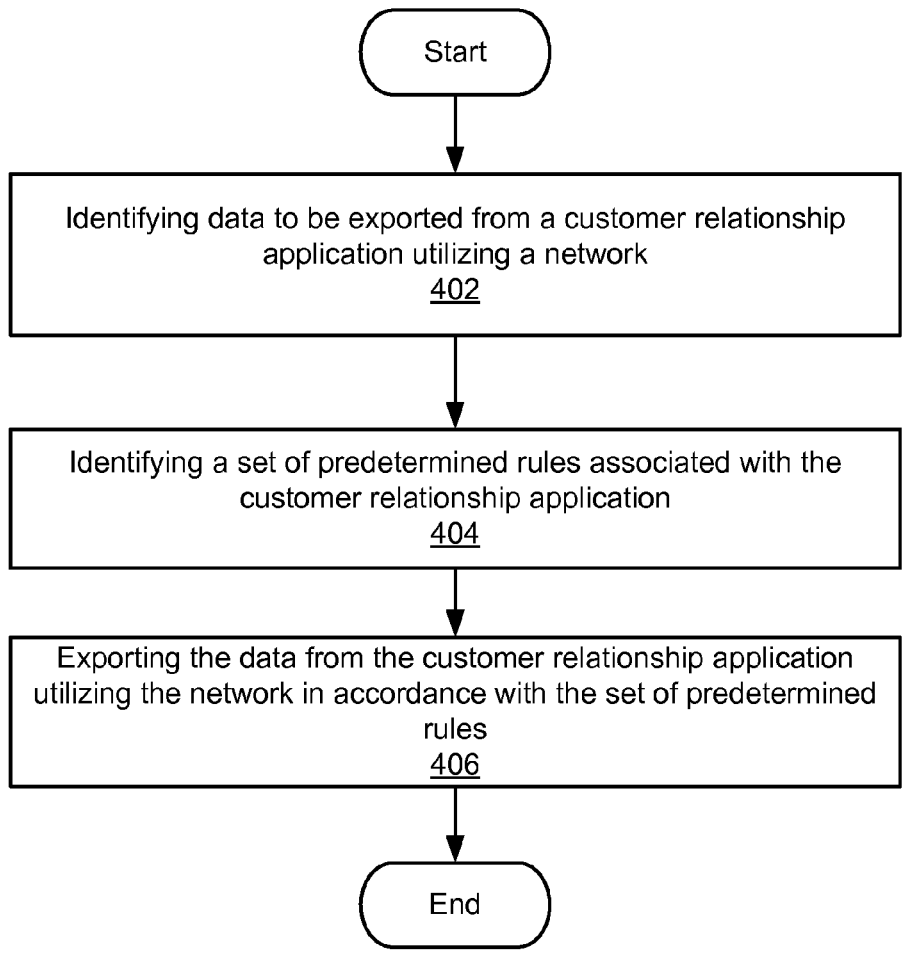
FIG. 4 is a flowchart of a process for exporting data in a network-based customer relationship application according to one embodiment.

FIG. 4 is a flowchart of a process 400 for exporting data in a network-based customer relationship application. In operation 402, data to be exported from a customer relationship application utilizing a network is identified. The data has been stored in memory accessible to the customer relationship application, in fields which are user-customizable. In operation 404, a set of predetermined rules associated with the customer relationship application is identified. In operation 406, the data is exported from the customer relationship application utilizing the network in accordance with the set of predetermined rules.

The predetermined rules can be specified based on user interaction with an application creation program, and can further include rules for referential integrity, required fields, and/or automatic sequence numbering. In yet another embodiment, the data is transformed. Preferably, the data is transformed based on user-created scripting functions.

An embodiment will now be presented by way of example. The example will describe an API wizard which receives basic information required to create an API service application that manages a Structured Query Language (SQL) import operation for importing data from an external database (the origin of the data) into a Clients field of a local database of a customer relationship application (the destination of the data).

The wizard maintains the use of existing logic and business rules in the customer relationship application, ensuring correct data imports from a variety of external data sources. The wizard is also used to import data into the customer relationship application in a manner that follows all the "rules" of the customer relationship application environment. Referential integrity, required fields, and/or automatic sequence numbering can be enforced through the applications created using the wizard. Thus, the wizard makes it possible to bridge legacy and other systems to the customer relationship application.

The example will further show how the application can be installed in the customer relationship application as a Windows® NT service at the end of the wizard's run, but note that the application may function as a standalone application, a Windows® 2000 service, or as any other type of application.

This example shows only one area in which an embodiment may be used. For example, creation of an application to export data from the customer relationship application to an external database follows a similar process, as would be understood by one skilled in the art. Thus, various embodiments can import from or export to SQL/ODBC data sources, text files, electronic mail, etc. One skilled in the art will understand how to make and use various embodiments for any area by simple variance from the following description.

Figure 5:
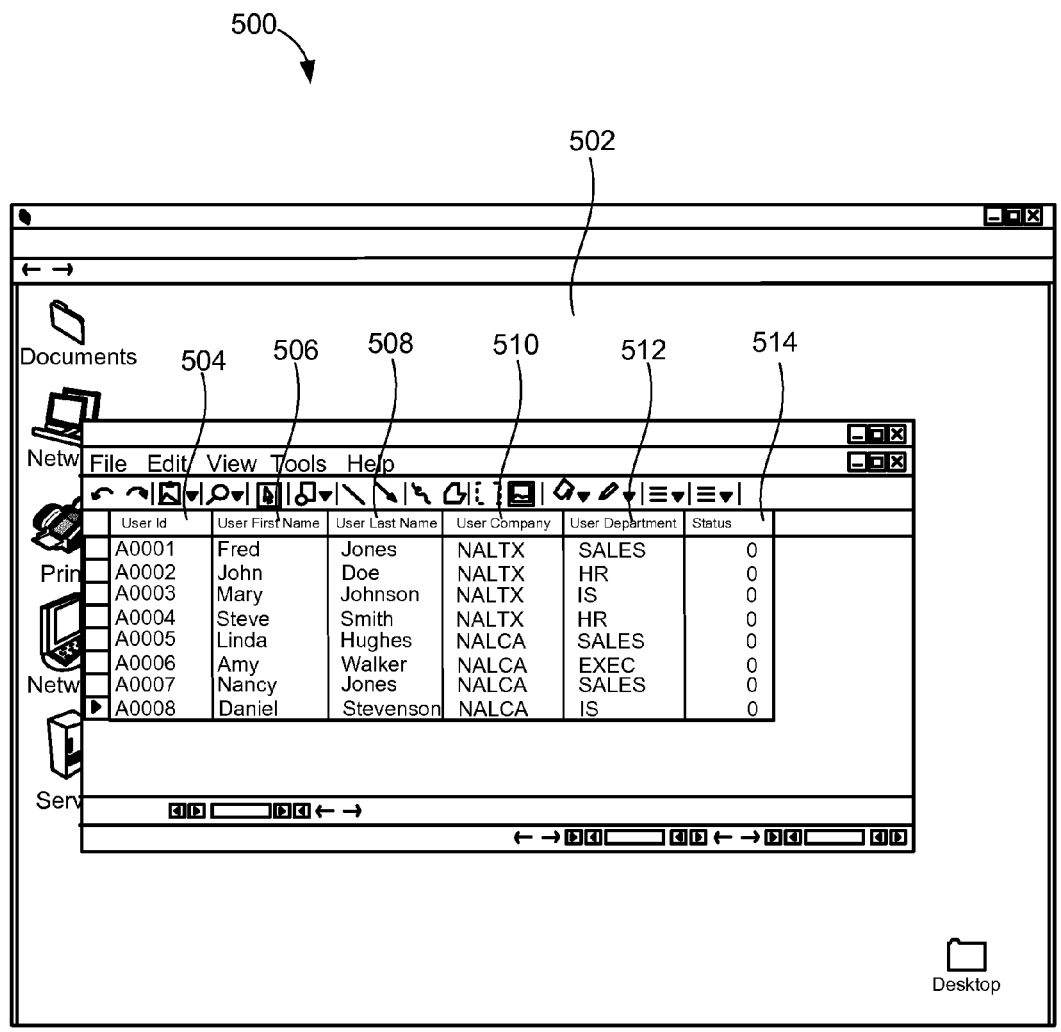
FIG. 5 is an illustration of a table of data of an external database according to an embodiment.

FIG. 5 depicts a screen 500 showing a table 502 of the contents of the external database, including client information that will be inserted in the local database. Note that the external and local databases may be any type of database, including a Microsoft© Access database.

Referring again to FIG. 5, the fields of the external database include a UserID field 504 that will be mapped to the client ID field in the local database. Other fields include UserFirstName 506, UserLastName 508, UserCompany 510, and UserDepartment 512, which will be mapped to the First Name, Last Name, Company ID, and Department ID fields of the local database, respectively (see FIG. 13 and the related discussion). The values of each field in the external database are also shown.

Figure 16:
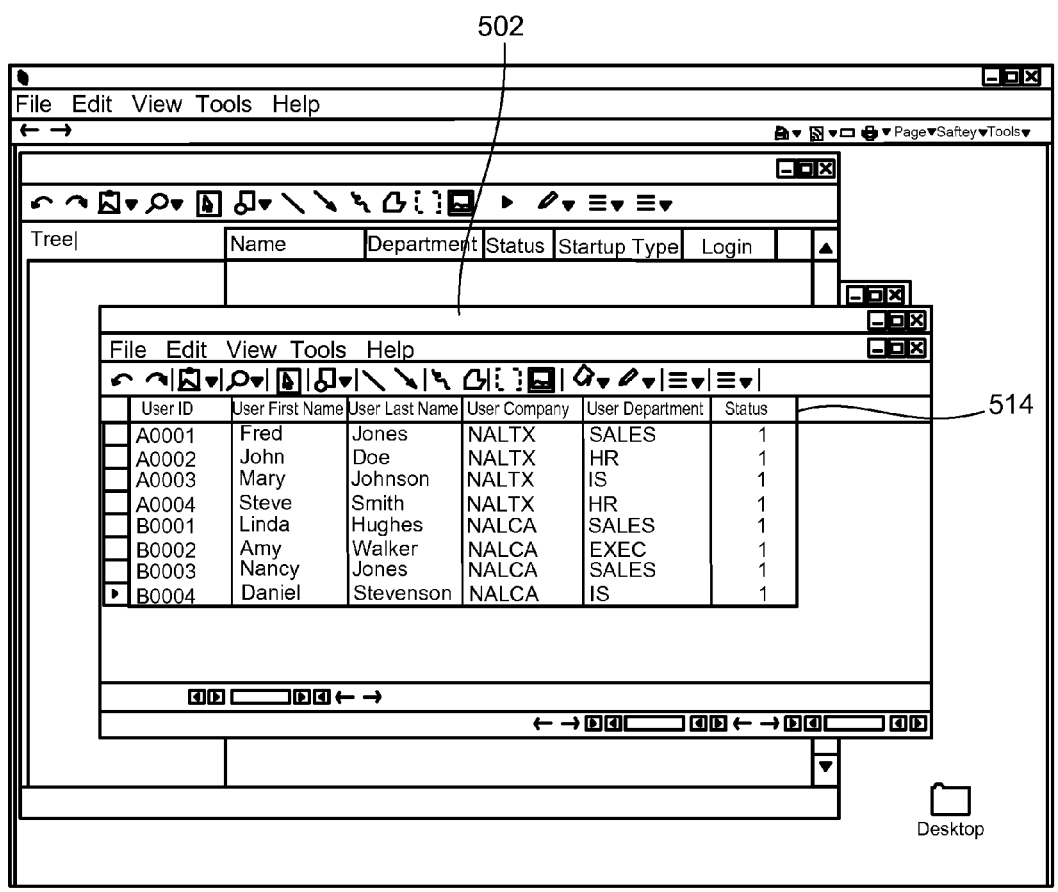
FIG. 16 depicts the table of the external database of FIG. 5 after an application created using the wizard of FIGS. 6-10 has exported data therefrom, according to an embodiment.

The Status field 514 is set to 0, indicating that the particular row of data is ready to be imported into the local database. When the import function is successful, the value will change to 1 (as shown in FIG. 16).

Figure 6:
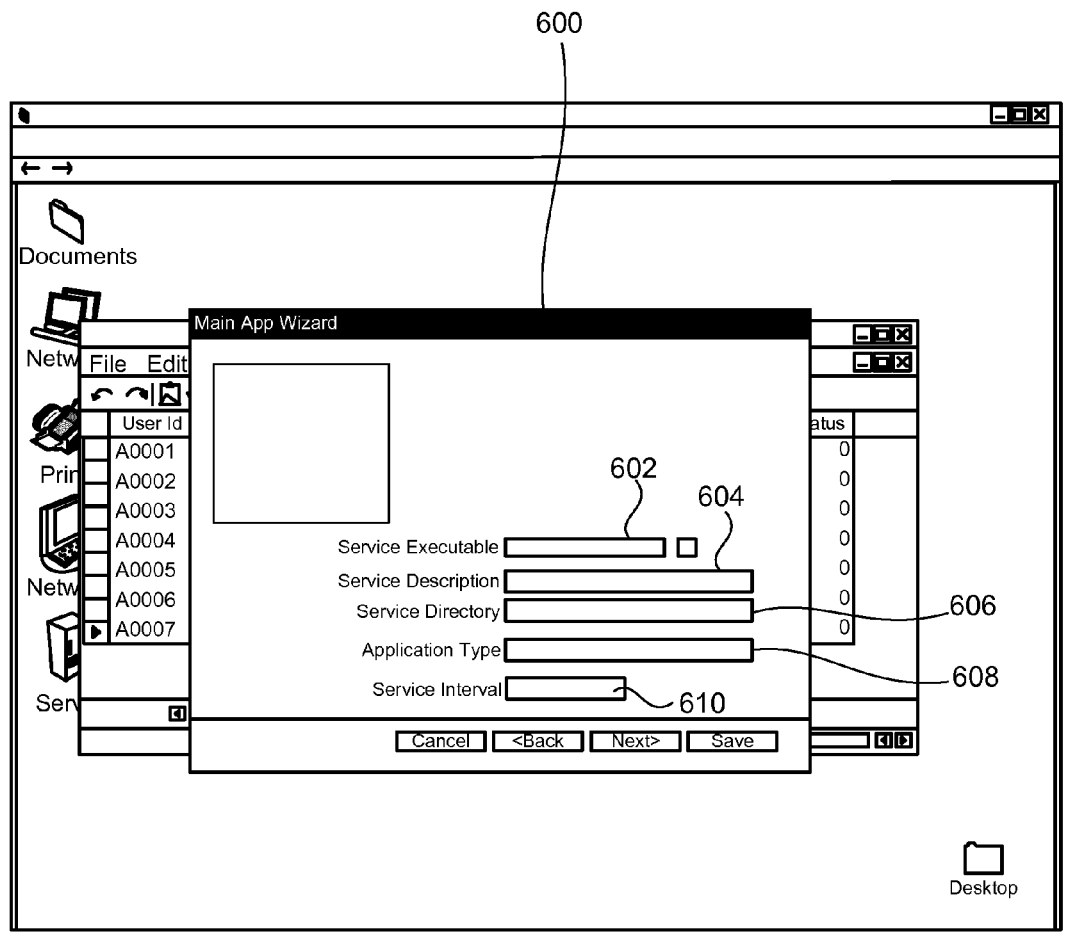
FIG. 6 is a depiction of a screen of an API application wizard according to an embodiment.

In use, the API wizard is started. The first screen shown is a basic information screen 600. See FIG. 6. The name of the application being created is entered in a Service Executable field 602. A Service Description field 604 is provided, into which a description of the application can be entered. The directory in which the application executable is saved is specified in the Service Directory field 606. The type of application is specified in the Application Type field 608. In this example, the application is an SQL import application. Other types of applications are described above. A service interval can be entered in the Service Interval field 610, indicating an amount of time that will elapse between executions of the application, such as every minute, every hour, once per day, etc. Here, the service interval is set at 10 seconds, meaning that 10 seconds will elapse between executions of the application. The Next button is selected.

Figure 7:
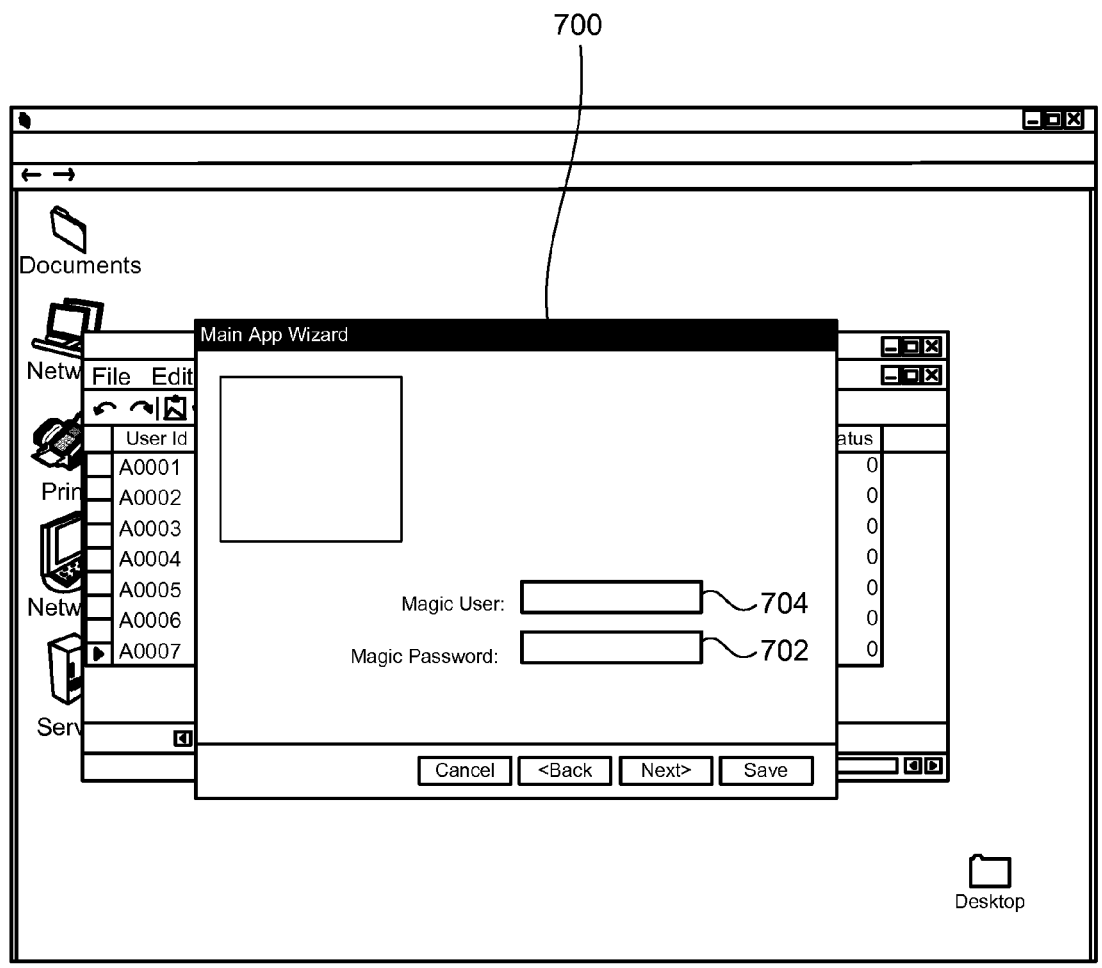
FIG. 7 is an illustration of a login data screen of an API application wizard according to an embodiment.

FIG. 7 illustrates a login data screen 700. Here, the user enters login information in the User and Password fields 702, 704 for logging in to the customer relationship application and/or external database (if required). The Next button is selected.

At this point, the wizard loads customer relationship application metadata objects to further refine options that can be set for this application. Once the objects are loaded, the customer relationship application module or "view" that is being imported to (or exported from) can be selected from a Master Module drop-down menu 802 of the module selection screen 800 shown in FIG. 8. Submodules of the master module may further be specified by selecting them from a Detail Module drop-down menu 804. Once the application is installed, the user will have the opportunity to define the mapping of fields between the import table in Microsoft® Access and the module in the customer relationship application, as described below.

Figure 8:
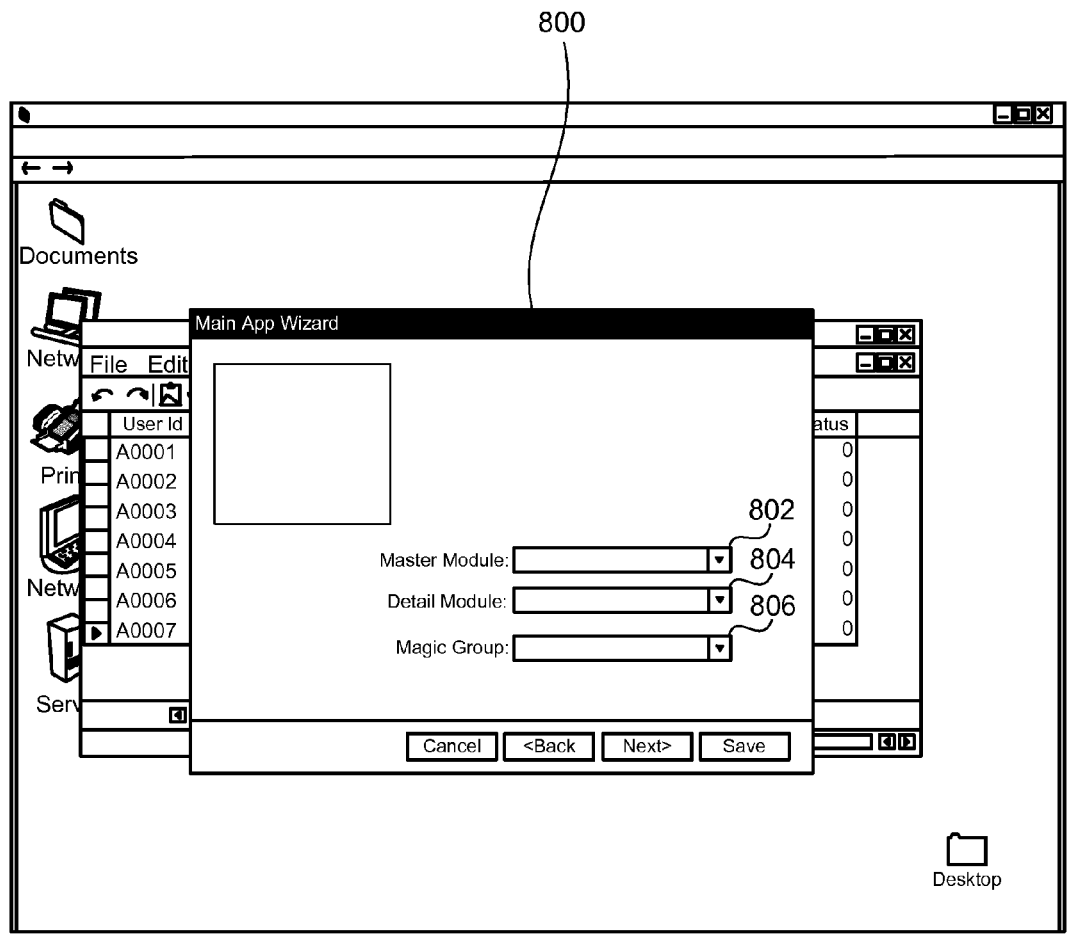
FIG. 8 is an illustration of a module selection screen of an API application wizard according to an embodiment.

With continued reference to FIG. 8, the Clients module is selected from the Master Module menu 802. A group can be selected from the Group drop-down menu 806. In this example, a default group is selected. For those sites using segregated data, the selection of the group can provide an important mechanism in determining how the data is created within the customer relationship application. The Next button is selected.

Figure 9:
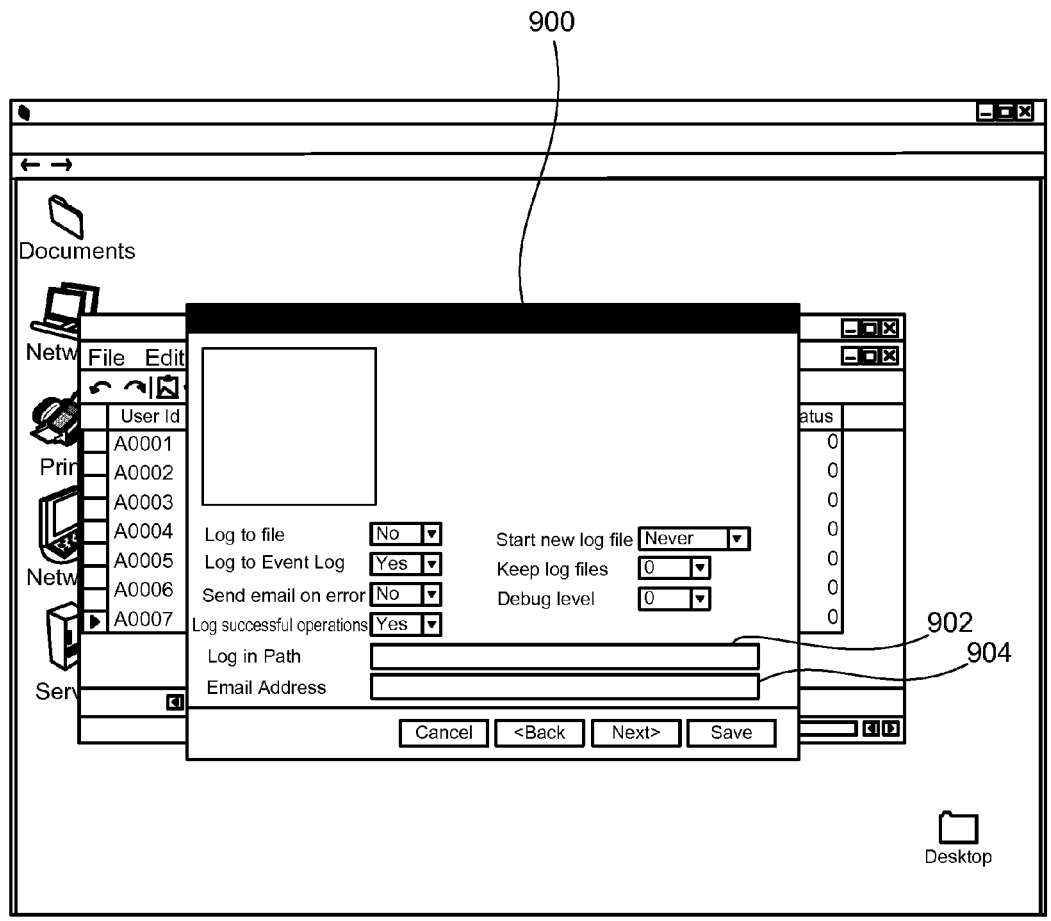
FIG. 9 is a depiction of a logging options screen of an API application wizard according to one embodiment.

FIG. 9 depicts a logging options screen 900. Selectable options include whether to log data transfer information to a file, whether to start a new log file and when to do so, how long to keep log files, whether to save logging information to a Windows® NT event log, whether to send an email to a user upon encountering an error, and whether to log successful operation. A level of debugging can also be set. If information is to be logged to a file, the path of the log file is entered in the Log file path field 902. If error messages are to be electronically mailed, the recipient's electronic mail address is specified in the EMail address field 904. In this example, successful operations are logged to the Windows® NT event log. The Next button is selected.

Figure 10:
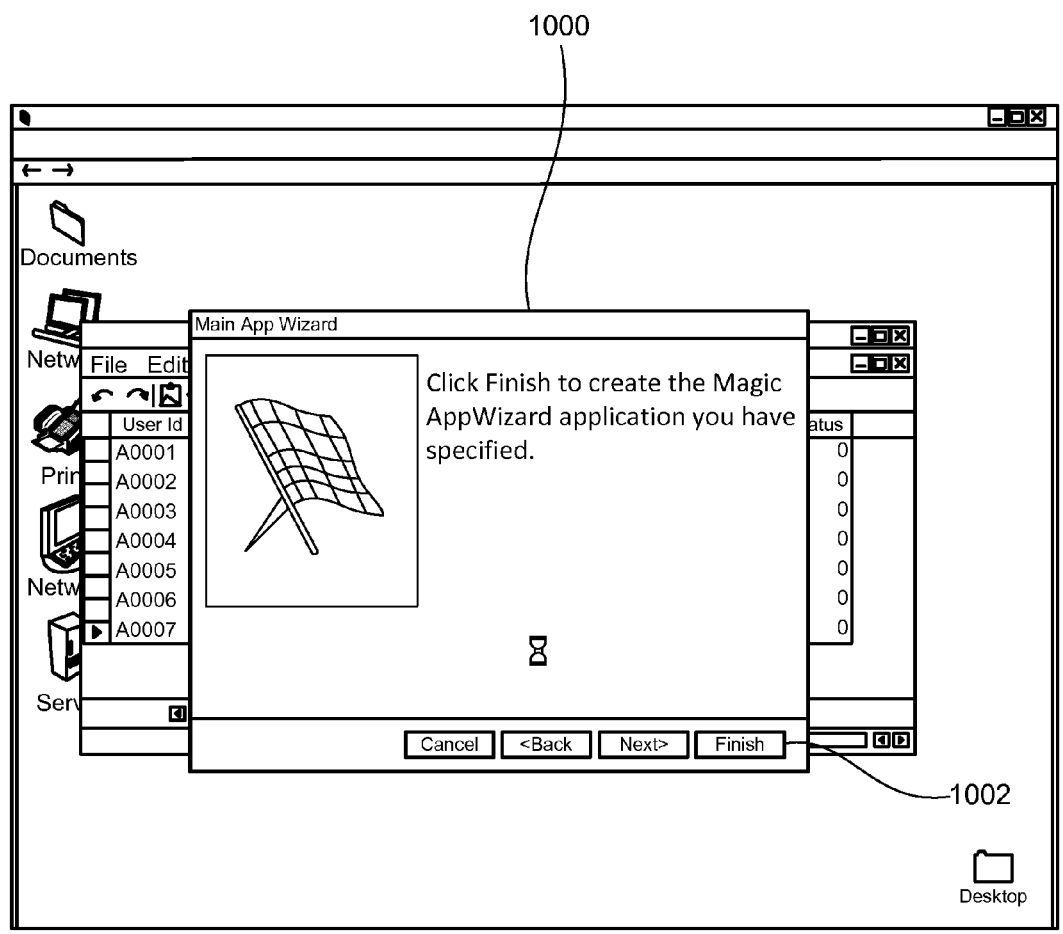
FIG. 10 is an illustration of a finish screen of an API application wizard according to an embodiment.

FIG. 10 illustrates a finish screen 1000 of the wizard. Upon selection of the Finish button 1002, the application is created.

Figure 11:
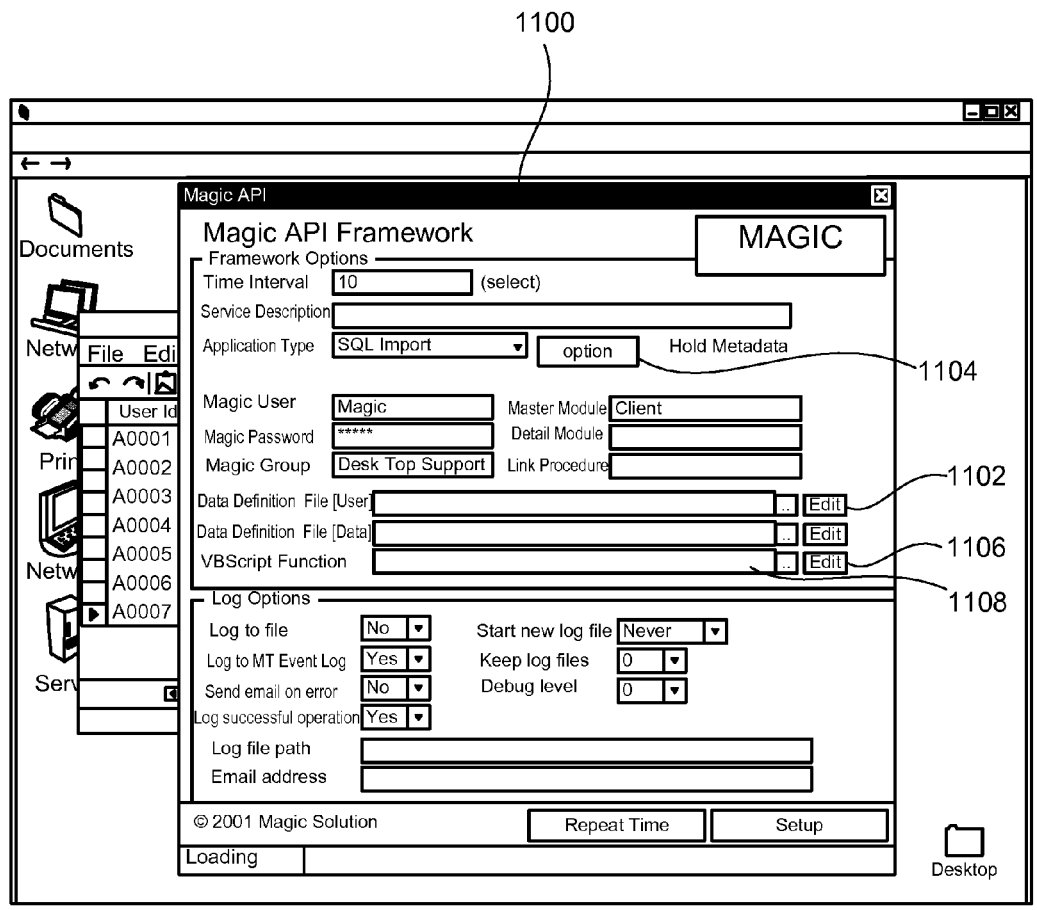
FIG. 11 is an illustration of an application option screen according to one embodiment.

Upon creation of the application, an application option screen 1100 is displayed, as shown in FIG. 11, which summarizes the information entered in screens 6, 7, 8, and 9. The application options screen 1100 also allows a user to add additional information and/or modify already-entered information for this application.

Figure 12:
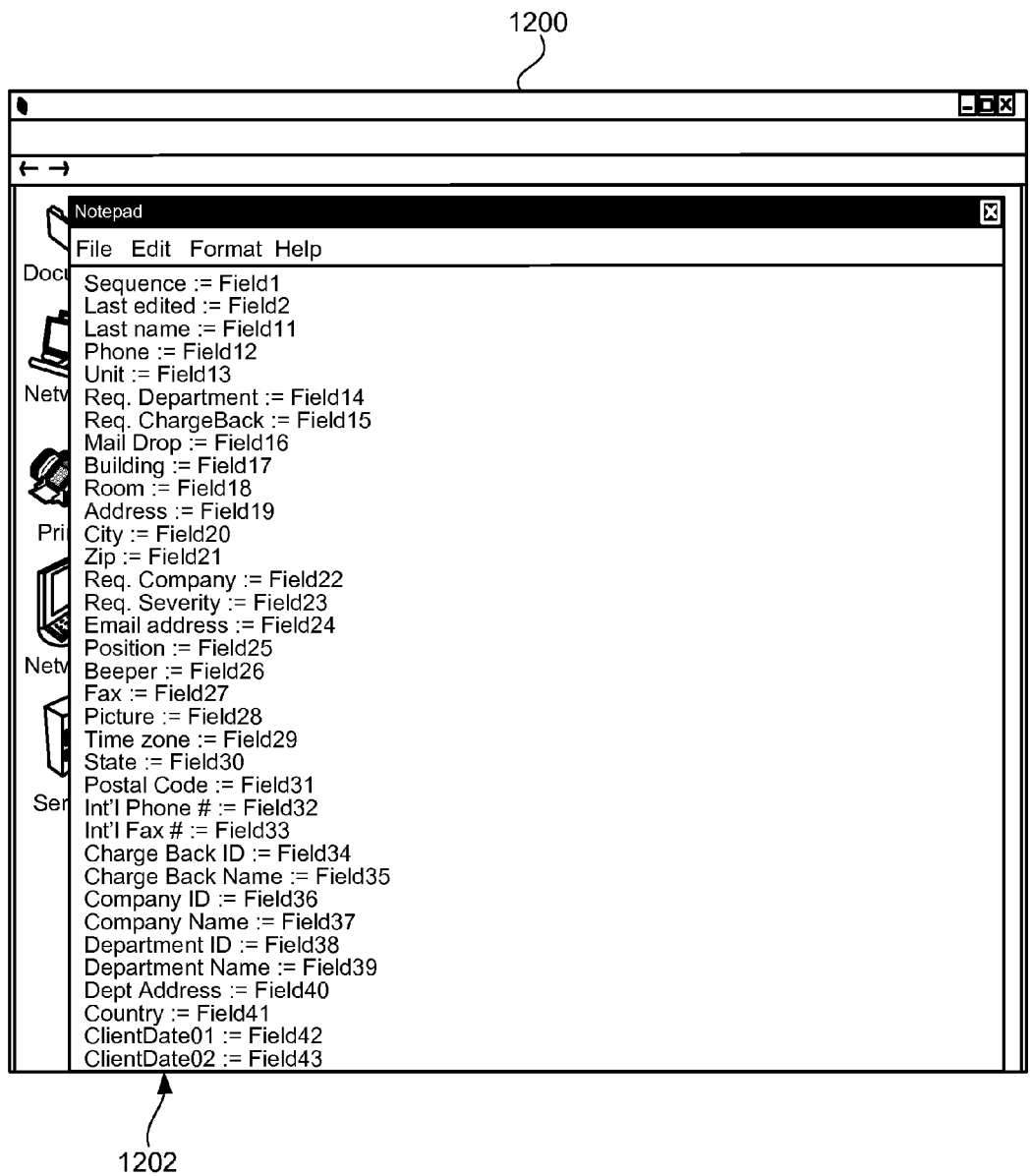
FIG. 12 is a depiction of a mapping screen according to one embodiment.

By default, the wizard creates a mapping that includes all of the available fields within the local database, including custom fields added at a client site. FIG. 12 depicts a mapping screen 1200 which lists the fields 1202 of the local database as determined during the data mapping created by the wizard. The mapping screen 1200 is displayed upon selection of the Edit button 1102 corresponding to the data definition file field of the application options screen 1100. See FIG. 11.

Figure 13:
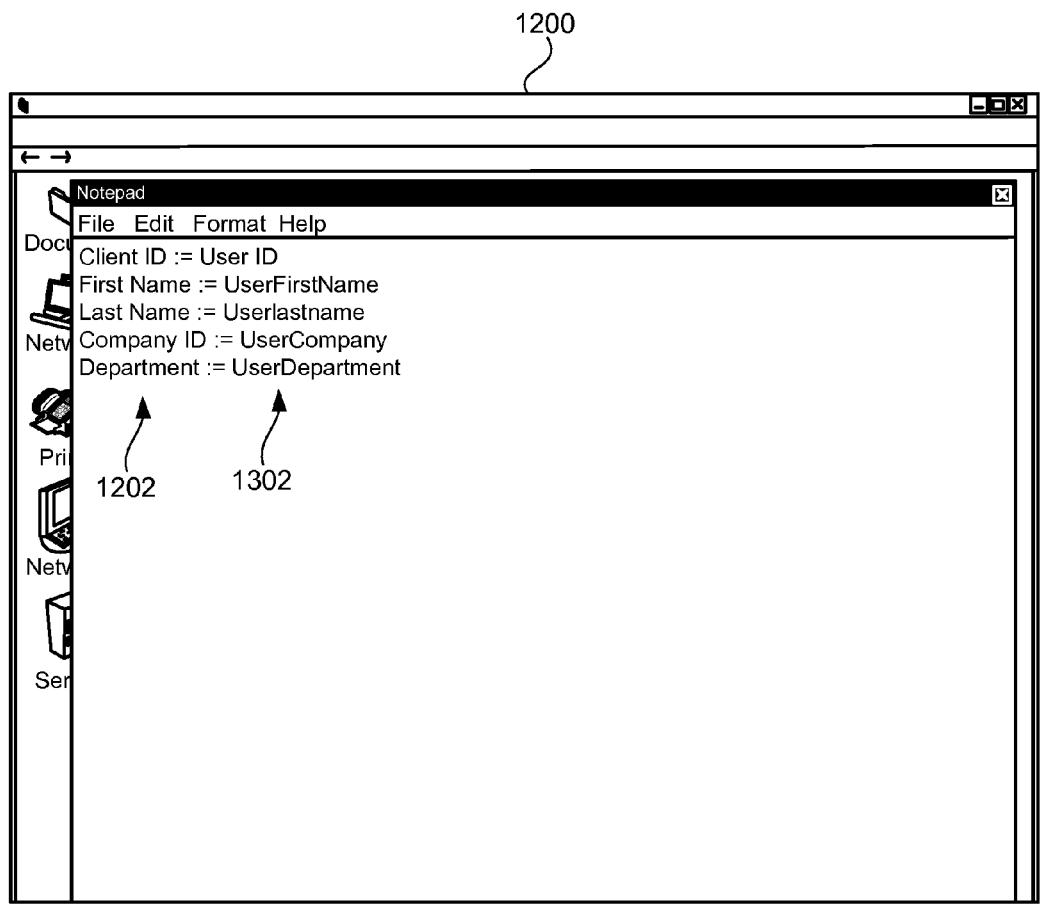
FIG. 13 illustrates the mapping screen of FIG. 12 upon user manipulation according to an embodiment.

Referring again to FIG. 12, the fields that will not be imported by the application are removed from the list in the mapping screen 1200. As shown in FIG. 13, the actual field names 1302 from the external SQL database are also inserted in place of the default mapping values for each of the corresponding fields of the local database.

Figure 14:
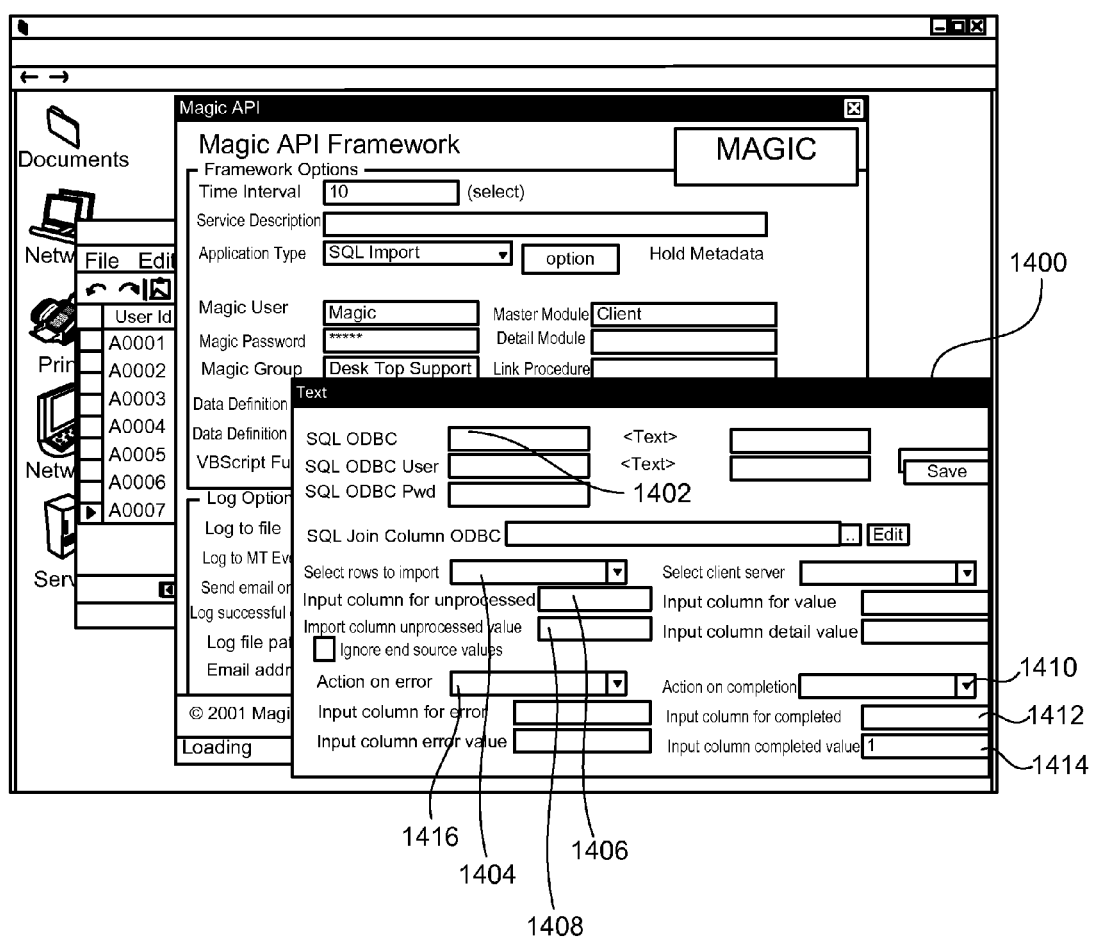
FIG. 14 depicts an SQL import options screen accessible from the application options screen of FIG. 11.

FIG. 14 depicts an SQL import options screen 1400 displayed upon selection of the Options button 1104 of the application options screen 1100 shown in FIG. 11. The SQL import options screen 1400 allows the user to define the source options for the SQL import. An ODBC data source for the Access table of the remote database, listed in the SQL ODBC field 1402, has already been defined in the Service Executable field 602 of the basic information screen 600, shown in FIG. 6.

With continued reference to FIG. 14, the rows to import are designated by selecting the desired option from the Select rows to import drop-down menu 1404. In this example, the column values have been specified in the mapping screen 1200, and so the Column value is selected from the menu 1404. Another option of the menu includes importing all rows.

The Status field of the external database is designated in the Import column for unprocessed field 1406. A designation that the rows to be imported have a status of 0 is entered in the Import column unprocessed value field 1408. The action on completion of a data transfer is selected in the Action on completion drop-down menu 1410. The Status field is designated in the Import column for completed 1412. By entering 1 in the Import column completed value field 1414, the application is instructed to change the value of the Status field for each row of the external database to 1 upon successful transfer of the data. Thus, once the import process is complete, the fields in the Status field 514 of the table 502 of the external database (FIG. 5) will change to 1, indicating that the data from each row has been imported into the local database.

A rule for the action to be taken if an error occurs can be specified by selecting an option from the Action on error drop-down menu 1416. In this example, the data in the external database associated with the error is left open so that the import operation can be attempted again. Another option in the menu 1416 is deleting the row and logging the error.

Another option is the use of scripting functions, preferably VBScript functions, which allows addition of custom code or custom logic at the client site 114 (FIG. 1) without further programming development. A VBScript function window (not shown) is accessible from the application option screen 1100 (FIG. 11) by selecting the Edit button 1106 associated with the VBScript Functions field 1108. The use of VBScript also allows VBA style functions to be written and added to the API wizard application. Note that any other scripting language can be used, including JavaScript.

All options required to run the application according to the illustrative embodiment have now been specified. The application now executes according to the user-specified rules and parameters.

Figure 15:
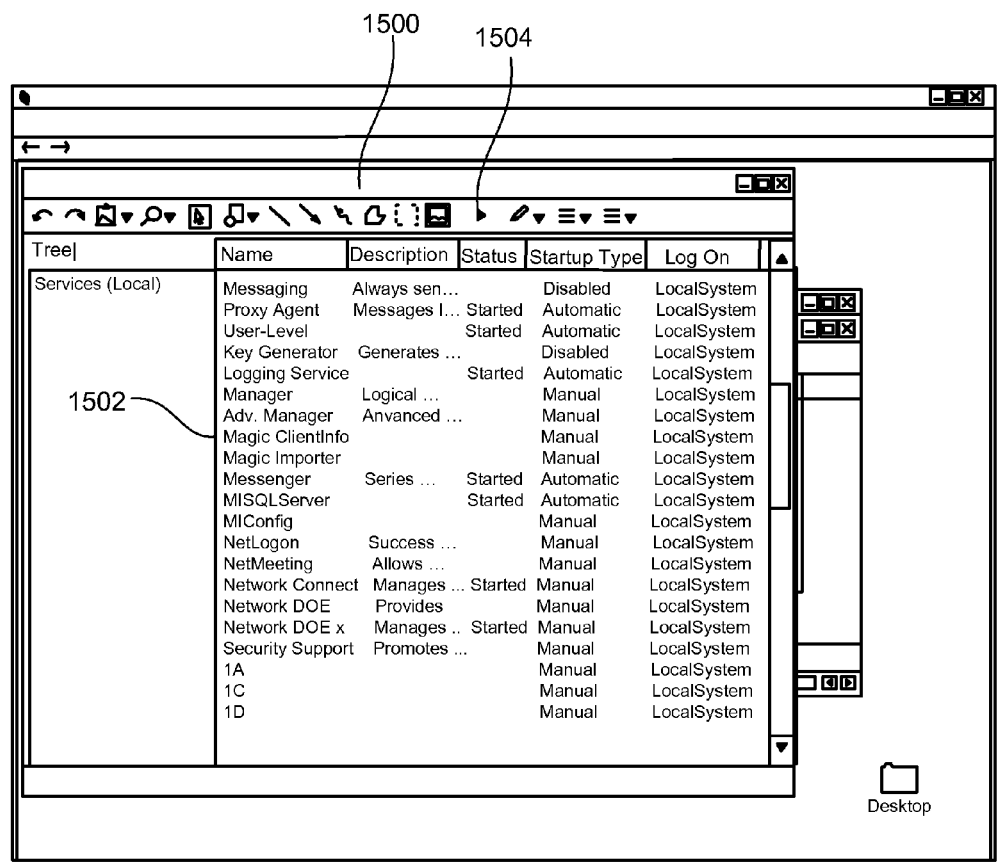
FIG. 15 illustrates a services application selection screen according to one embodiment.

FIG. 15 illustrates a services application selection screen 1500. As shown, the newly created application ClientInfo 1502 appears in the list of service applications. The application is started in the normal way in Windows® NT by selecting the application 1502 and then selecting the start button 1504.

When running, the application imports the specified data from the external database into the local database according to the mapping designation discussed with respect to FIGS. 12 and 13.

The application option screen 1100 can be redisplayed while the application is running. This behavior is controllable from within the new Windows®NT service application itself, such as by selecting and deselecting a check box on a Properties page.

FIG. 16 depicts the table 502 of the external database. See also FIG. 5. As shown in FIG. 16, once the import process is complete, the values in the Status field 514 of the table 502 have changed to 1, indicating that the data from each row has been imported into the local database.

Figure 17:
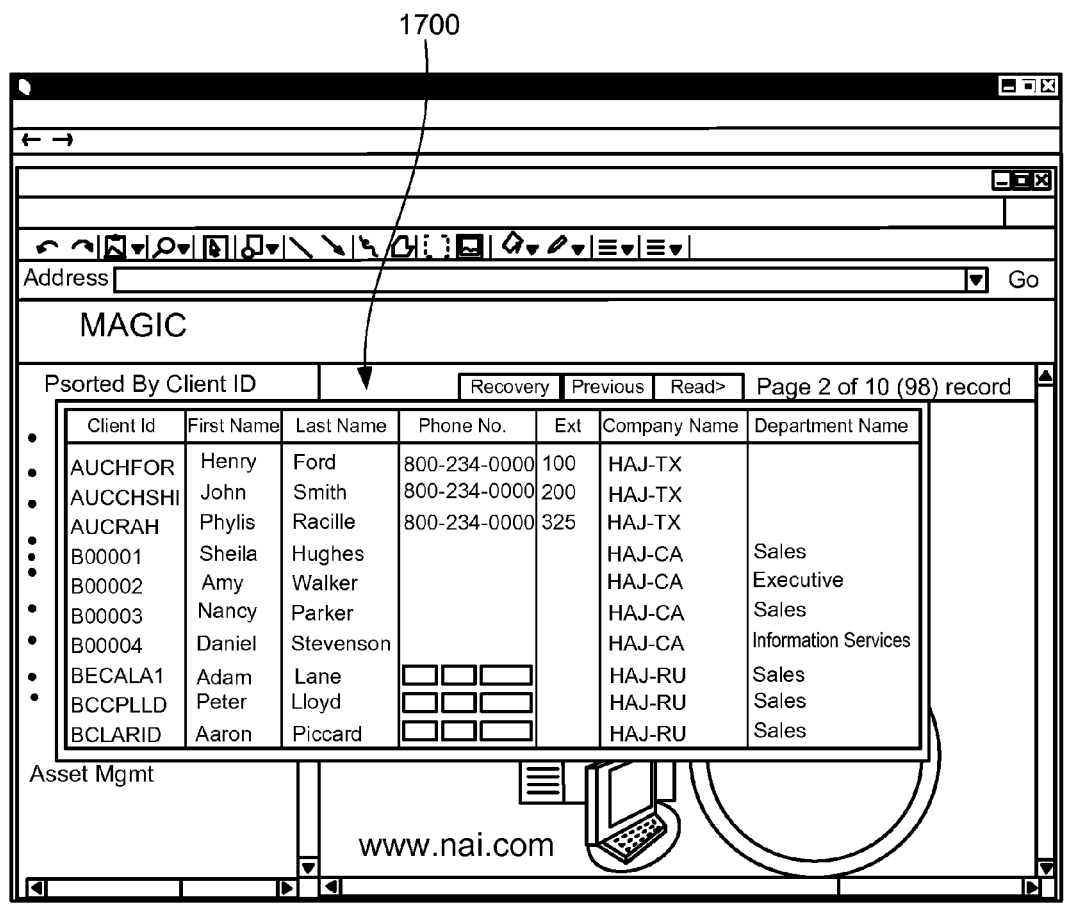
FIG. 17 illustrates a portion of a table of a local database after an application created using the wizard of FIGS. 6-10 has imported data thereto, according to one embodiment.

FIG. 17 illustrates a portion of a table 1700 of the local database. As shown, the data from the external database has been imported and appears therein under the appropriate field headings.

Thus, in summary, after the user enters the appropriate information in the fields of the wizard and specifies what is coming into the customer relationship application or going out of the customer relationship application, the end result is installation of a service application on a server such that the application can be run as a system service that can be scheduled or run periodically, not just as a normal program. This service is managed in a normal way, because it is a true operating system service in contrast to a normal program.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A method for importing data from an origin to a destination, the method comprising:
   identifying data to be imported, over a network, from the origin to the destination, the destination associated with a customer relationship application including a service application;
   identifying a set of predetermined rules associated with the customer relationship application;
   associating at least one user-specified function with the identified data, the at least one user-specified function capable of transforming at least a portion of the identified data;
   periodically executing the service application in order to import the identified data from the origin to the destination utilizing the network in accordance with the set of predetermined rules, wherein the importing includes:
      mapping first fields for the data in the origin to second fields for the destination,
      translating first field names of the mapped first fields to second field names of the second fields, and
      transforming at least a portion of the identified data from the origin to the destination using the at least one user-specified function, the at least one user-specified function being modifiable from an application option screen that includes access to a scripting language; and
   making the imported data accessible to the customer relationship application, wherein the mapping and translating are customizable by the user such that the second field names and the second fields are customizable by the user.

2. The method of claim 1, wherein the application option screen includes:
   a first user input area for receiving a selection of the at least one user-specified function; and
   a second user input area for receiving edits of the scripting language for the user-specified function.

3. The method of claim 1, wherein the service application is generated based on the predetermined rules.

4. The method of claim 3, wherein periodically executing the service application includes periodically executing the service application at user-defined intervals.

5. The method as recited in claim 1, wherein the predetermined rules are specified based on user interaction with an application creation program.

6. The method as recited in claim 1, wherein the at least one user-specified function comprises at least one user-created scripting function selected from the group consisting of a VBScript function or a JavaScript function.

7. The method as recited in claim 1, further comprising exporting data from the customer relationship application utilizing the network.

8. The method of claim 1, wherein the predetermined rules relate to at least one of referential integrity, required fields, and automatic sequence numbering.

9. A non-transitory computer program product being tangibly embodied in a non-transitory computer-readable storage medium, the computer program comprising:
   computer code for identifying data, over a network, to be imported from an origin to a destination, the destination associated with a customer relationship application including a service application;
   computer code for identifying a set of predetermined rules associated with the customer relationship application;
   computer code for associating at least one user-specified function with the identified data, the at least one user-specified function capable of transforming at least a portion of the identified data;
   computer code for periodically executing the service application in order to import the identified data from the origin to the destination utilizing the network in the accordance with the set of predetermined rules, wherein the computer code for importing includes:
      computer code for mapping first fields for the data in the origin to second fields for the destination, computer code for translating first field names of the mapped first fields to second field names of the second fields, and
      computer code for transforming at least a portion of the identified data from the origin to the destination using the at least one user-specified function, the user-specified function being modifiable from an application option screen that includes access to a scripting language; and
   computer code for making the imported data accessible to the customer relationship application, wherein the mapping and translating are customizable by the user such that the second field names and the second fields are customizable by the user.

10. A system for importing data from an origin to a destination, the system comprising:
   logic for identifying data over a network, to be imported from the origin to the destination, the destination associated with a customer relationship application including a service application;
   logic for identifying a set of predetermined rules associated with the customer relationship application;
   logic for associating at least one user-specified function with the identified data, the at least one user-specified function capable of transforming at least a portion of the identified data;
   logic for periodically executing the service application in order to import the identified data from the origin to the destination utilizing the network in accordance with the set of predetermined rules, wherein the logic for importing includes:
      logic for mapping first fields for the data in the origin to second fields for the destination, logic for translating first field names of the mapped first fields to second field names of the second fields, and
      logic for transforming at least a portion of the identified data from the origin to the destination using the at least one user-specified function, the user-specified function being modifiable from an application option screen that includes access to a scripting language; and
   logic for making the imported data accessible to the customer relationship application, wherein the mapping and translating are customizable by the user such that the second field names and the second fields are customizable by the user.

11. A method for exporting data from an origin to a destination, the method comprising:
   identifying data, over a network, to be exported from the origin to the destination, the identified data accessible to a customer relationship application associated with the origin, the customer relationship application including a service application;

identifying a set of predetermined rules associated with the customer relationship application;

associating at least one user-specified function with the identified data, the at least one user-specified function capable of transforming at least a portion of the identified data; and periodically executing the service application in order to export the identified data from the origin to the destination utilizing the network in accordance with the set of predetermined rules, wherein the exporting includes:

mapping first fields for the data in the origin to second fields for the destination, translating first field names of the mapped first fields to second field names of the second fields, and transforming at least a portion of the identified data from the origin to the destination using the at least one user-specified function, the user-specified function being modifiable from an application option screen that includes access to a scripting language, wherein the mapping and translating are customizable by the user such that the second field names and the second fields are customizable by the user.

12. The method of claim 11, wherein the application option screen includes:

a first user input area for receiving a selection of the at least one user-specified function; and a second user input area for receiving edits of the scripting language for the user-specified function.

13. The method of claim 11, wherein the service application is generated based on the predetermined rules.

14. The method of claim 13, wherein periodically executing the service application includes periodically executing the service application at user-defined intervals.

15. The method as recited in claim 11, wherein the predetermined rules are specified based on user interaction with a service application creation program.

16. The method as recited in claim 11, wherein the at least one user-specified function comprises at least one user-created scripting function selected from the group consisting of a VBScript function or a JavaScript function.

17. The method as recited in claim 11, further comprising importing data to the customer relationship application utilizing the network.

18. The method of claim 11, wherein the predetermined rules relate to at least one of referential integrity, required fields, and automatic sequence numbering.

19. A non-transitory computer program product for exporting data from an origin to a destination, the computer program product comprising:

computer code for identifying data, over a network, to be exported from the origin to the destination, the identified data accessible to a customer relationship application associated with the origin, the customer relationship application including a service application;

computer code for identifying a set of predetermined rules associated with the customer relationship application;

computer code for associating at least one user-specified function with the identified data, the at least one user-specified function capable of transforming at least a portion of the identified data; and computer code for periodically executing the service application in order to export the identified data from the origin to the destination utilizing the network in accordance with the set of predetermined rules, wherein the computer code for exporting includes:

computer code for mapping first fields for the data in the origin to second fields for the destination, computer code for translating first field names of the mapped first fields to second field names of the second fields, and computer code for transforming at least a portion of the identified data from the origin to the destination using the at least one user-specified function, the user-specified function being modifiable from an application option screen that includes access to a scripting language, wherein the mapping and translating are customizable by the user such that the second field names and the second fields are customizable by the user.

20. A system for exporting data from an origin to a destination, the system comprising:

logic for identifying data, over a network, to be exported from the origin to the destination, the identified data accessible to a customer relationship application associated with the origin, the customer relationship application including a service application;

logic for identifying a set of predetermined rules associated with the customer relationship application;

logic for associating at least one user-specified function with the identified data, the at least one user-specified function capable of transforming at least a portion of the identified data; and logic for periodically executing the service application in order to export the identified data from the origin to the destination utilizing the network in accordance with the set of predetermined rules, wherein the logic for exporting includes:

logic for mapping first fields for the data in the origin to second fields for the destination, logic for translating first field names of the mapped first fields to second field names of the second fields, and logic for transforming at least a portion of the identified data from the origin to the destination using the at least one user-specified function, the user-specified function being modifiable from an application option screen that includes access to a scripting language, wherein the mapping and translating are customizable by the user such that the second field names and the second fields are customizable by the user.

* * * * *

UNITED STATES PATENT AND TRADEMARK OFFICE
CERTIFICATE OF CORRECTION

PATENT NO. : 10,002,203 B2
APPLICATION NO. : 14/729684
DATED : June 19, 2018
INVENTOR(S) : George et al.

It is certified that error appears in the above-identified patent and that said Letters Patent is hereby corrected as shown below:

In Column 12, Lines 22-25, Claim 19, delete "function being modifiable……….by the user." and insert the same at Line 21 after "user-specified" as a continuation paragraph.

Signed and Sealed this
Twenty-eighth Day of August, 2018

Andrei Iancu
*Director of the United States Patent and Trademark Office*